(12) United States Patent
Van Brocklin

(10) Patent No.: US 7,679,633 B2
(45) Date of Patent: Mar. 16, 2010

(54) FACILITATING FOCUSING OF A MULTI-FUNCTION DIGITAL MEDIA DRIVE

(75) Inventor: Andrew L. Van Brocklin, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1193 days.

(21) Appl. No.: 11/237,979

(22) Filed: Sep. 29, 2005

(65) Prior Publication Data

US 2007/0070841 A1    Mar. 29, 2007

(51) Int. Cl.
*B41J 2/47*    (2006.01)
*G11B 7/00*    (2006.01)

(52) U.S. Cl. .................................... 347/225; 369/44.35

(58) Field of Classification Search .............. 369/44.29, 369/44.35
See application file for complete search history.

(56) References Cited

U.S. PATENT DOCUMENTS

| | | | |
|---|---|---|---|
| 4,496,246 A | 1/1985 | Ota et al. | |
| 5,149,927 A | 9/1992 | Stahly | |
| 5,708,643 A * | 1/1998 | Choi et al. | 369/112.26 |
| 6,167,006 A * | 12/2000 | Tanaka et al. | 369/44.26 |
| 6,229,771 B1 * | 5/2001 | Kosoburd et al. | 369/44.23 |
| 6,853,042 B2 | 2/2005 | Yoshida et al. | |
| 6,864,907 B2 | 3/2005 | Bronson | |
| 6,938,890 B2 * | 9/2005 | Yoo et al. | 369/112.26 |
| 6,992,967 B2 * | 1/2006 | Jeong | 369/112.1 |
| 7,324,129 B2 * | 1/2008 | Hanks | 347/225 |
| 7,436,743 B2 * | 10/2008 | Kubo et al. | 369/47.53 |
| 2002/0191517 A1 * | 12/2002 | Honda et al. | 369/53.29 |
| 2003/0108708 A1 | 6/2003 | Anderson et al. | |

OTHER PUBLICATIONS http://www.dvuser.co.uk/Main%20pages/news%20pages/jvc%20bluray.html (JVC Develops World's First Blu-ray/DVD Combon, ROM Disc Technology, Jun. 21, 2005.
Miyauchi, N., et al., "Hologram Laser for CD-ROM Drive", Opto-electronic Devices Division, Electronic Components Group, Sharp Corporation (Japan).
http://www.disctronics.co.uk/technology/cdbasics/cd_specs.htm (CD Physical Specification), Jun. 21, 2005.
http://www.anandtech.com/storage/showdoc.html?i=2010 ((Anand Techn: AT News Update: DVD Dual Layer Primer), Jun. 21, 2005.
http://harlie.gsfc.nasa.gov/HOES/HOEs.htm (Holographic Optical Elements), May 15, 2005.

* cited by examiner

*Primary Examiner*—Peter Vincent Agustin
*Assistant Examiner*—Aneeta Yodichkas

(57) ABSTRACT

A method of facilitating focusing of a multi-function digital media drive, is such as to generate two or more error signals each indicative of a focus of an energy beam by an optical arrangement onto first and second different recording layers of a digital medium in the drive, the first recording layers being covered with a protective, energy beam transparent substrate. A selected on of the error signal is used to determine a focus correction.

1 Claim, 7 Drawing Sheets

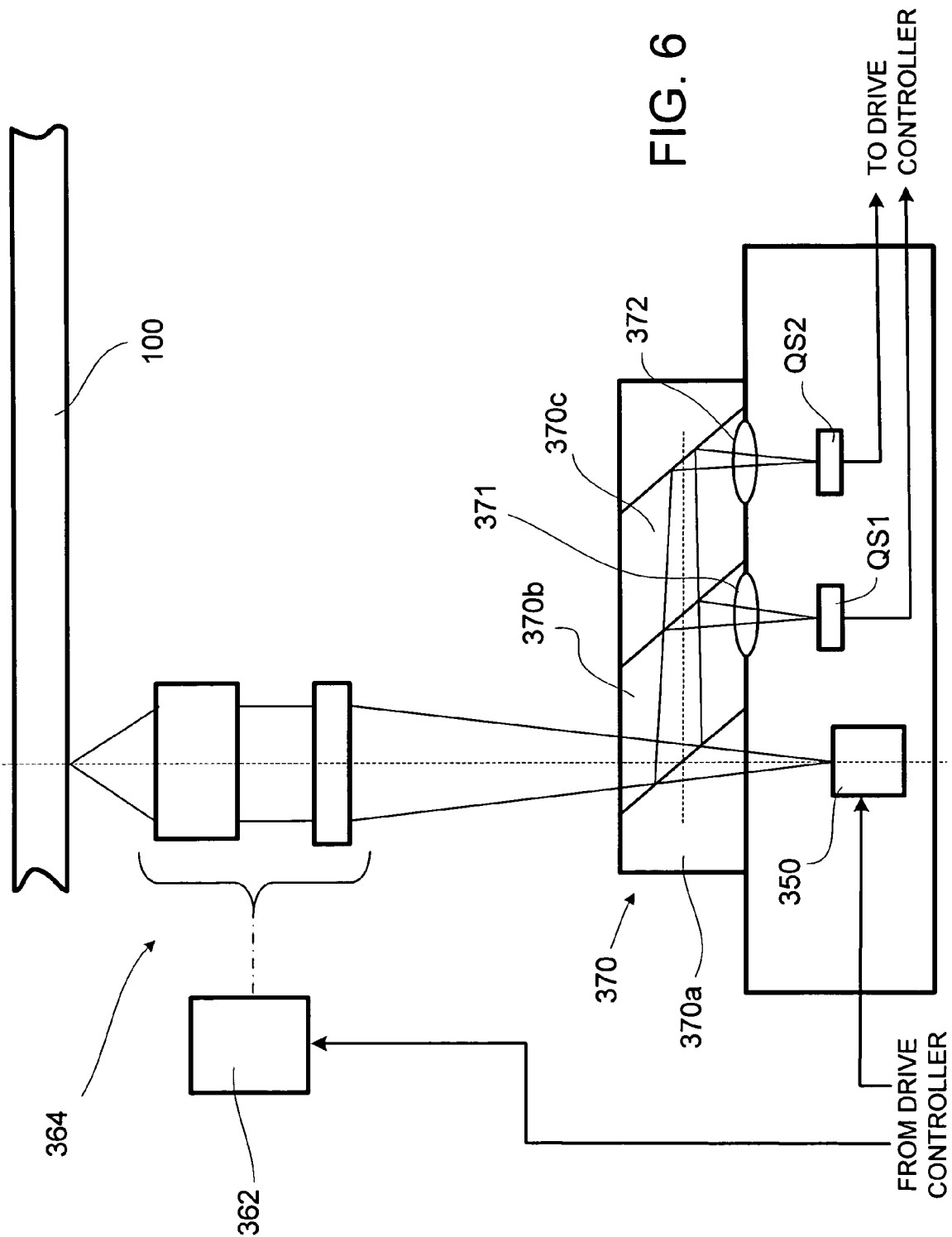

FACILITATING FOCUSING OF A MULTI-FUNCTION DIGITAL MEDIA DRIVE

BACKGROUND OF THE INVENTION

The present invention relates generally to the field of media labeling. In particular, the invention relates to methods and systems for correcting for the change in optical characteristics which occur when a disc is subject to label writing as different from data writing/reading.

Digital media, such as compact discs (CDs) or digital video discs (DVDs), are a popular form of storage media. Recently, writable digital media have become increasingly popular among users for storing personalized data, including creating their own set of musical compilations, pictures, etc. Once the user has stored or written digital data onto the medium, the user may label the medium by either writing on the medium by hand or affixing a printed label onto the medium using an adhesive.

More recently, systems have been developed for imprinting a labeling layer on a digital medium using a read/write laser of the disc drive. In such systems, laser energy is applied to change the color or darkness of desired locations on the labeling layer so as to produce an image.

In such systems, the same optical pickup unit (OPU) may be used both for writing data to a data layer of the digital medium, and for writing a label to the labeling layer. Writing to the data layer requires passing the laser energy from the OPU through a substrate layer such as transparent polycarbonate, acrylate or glass. The OPU is typically designed for writing to the data layer, and thus the optics used in writing data are pre-corrected for the spherical aberration introduced by the transparent substrate of a typical thickness. However, in writing to the labeling layer the laser energy passes either primarily through air, or through a smaller amount of transparent material, rather than through the same thickness of the substrate as when writing to the data layer. As a result, when the optical path designed for writing to the data layer is also used to write a label, a strong spherical aberration of the opposite sign is introduced as the optics are focused through the air or the smaller thickness of transparent material This aberration causes some of the optical sensor functions in the drive to operate improperly. This results in difficulty in using the expected and usual methods for servo feedback for positioning the objective lens for focus.

BRIEF DESCRIPTION OF THE DRAWINGS

FIG. 6 is a schematic illustration of a part of a digital media drive which embodies a further embodiment of the invention.

DETAILED DESCRIPTION OF CERTAIN EMBODIMENTS

Figure 1:
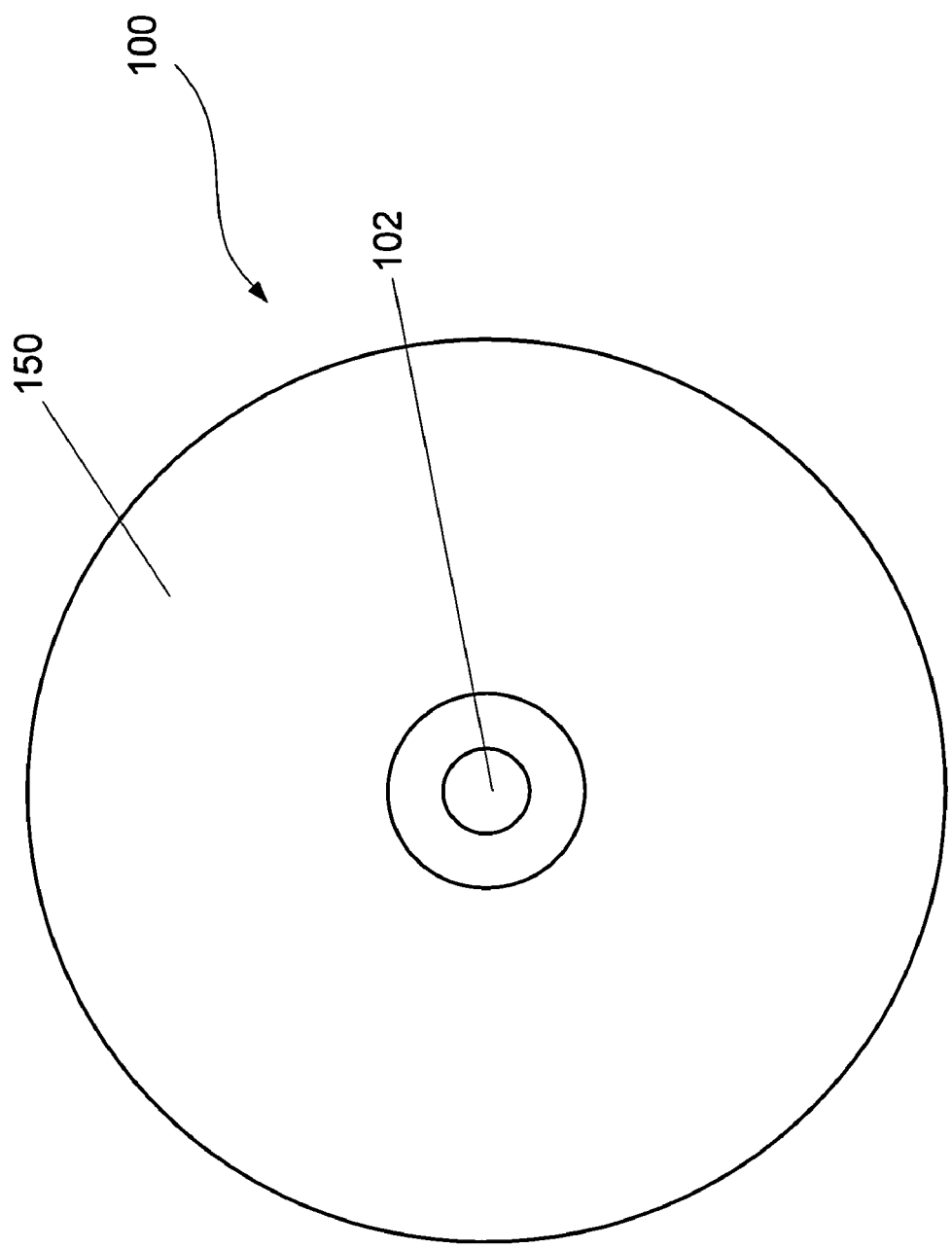
FIG. 1 is a top view of an embodiment of a digital medium.

Referring to FIG. 1, an exemplary digital medium is illustrated. The digital medium 100 may be an optical medium adapted to record and store digital information and is not limited to any particular type and may be a compact disc (CD), a digital video disc (DVD), a CD-ROM, CD-R, CD-RW or a DVD-ROM, DVD-R, DVD+R, DVD-RW, or a Blu-Ray drive for example. These arrangements can be either single of double layer arrangements and can use IR, red, or blue lasers, or a combination of these.

The digital medium 100 is provided with a central opening 102 for mounting the digital medium 100 onto a digital media drive, for example. The digital medium 100 includes a label layer 150 on one surface. This layer will be described in further detail hereinafter.

Figure 2A:
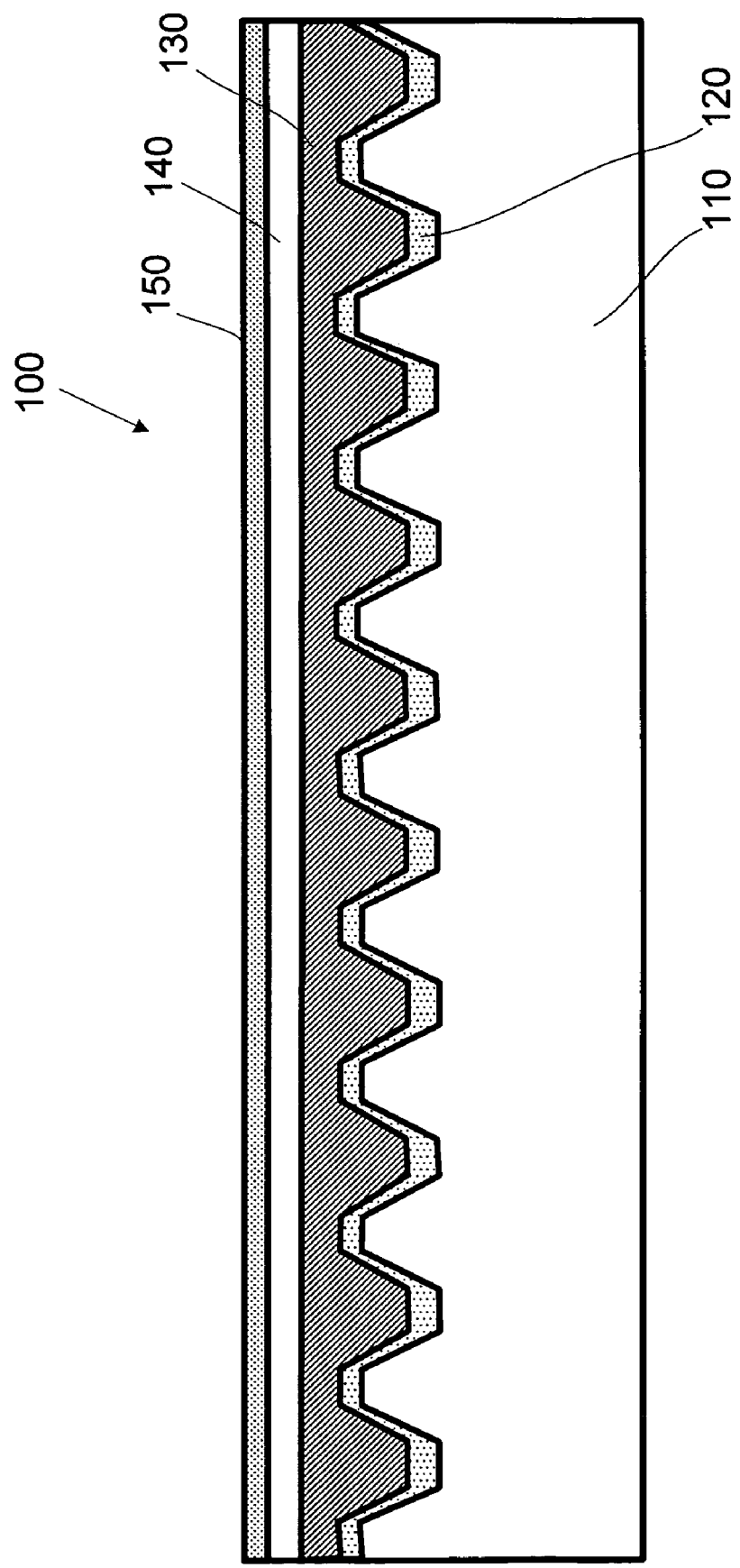
FIG. 2A is a sectional view of the digital medium shown in FIG. 1 which in this instance is depicted by way of example as a writable DVD or so called DVD-R.

Referring now to FIG. 2, a cross-sectional view of one embodiment of the digital medium of FIG. 1 is illustrated. The medium 100, in this example, includes a substrate layer 110, which in one embodiment may be 1.2 mm thick and may be made of a laser-transparent material such as polycarbonate, acrylate or glass, for example. A data recording layer 120 is provided on the substrate layer 110 upon which digital data may be written and stored, and which can subsequently be read.

In this embodiment, the data recording layer 120 includes or more grooved tracks formed on the substrate itself. The data can then be read from the data layer 120 using a laser. As is well understood by those skilled in the art, a laser beam impinges upon the substrate layer 110 (i.e. from the bottom of the medium as illustrated in FIG. 2) and generally penetrates through the substrate layer 110 to read from or write to the data layer 120.

A reflective or mirror layer 130 is formed over the data recording layer 120. Note that the reflective and the data layers are very thin, and as such they generally follow the contours of the groove. This reflective layer 130 may be, for example, an aluminum or gold reflective layer. A thin layer of clear lacquer 140, such as acrylic, is provided above the reflective and data layers for protection. The lacquer layer 140 may have a thickness of approximately four microns.

The configuration of layers 110, 120, 130, 140 are typical for CD-R type disc media. Of course, the present invention is not limited to this particular single layer type recording media as noted above, and multi layer arrangements such as found in DVD-DL (dual layer) wherein the first and second data recording layers are separated by a thickness of clear substrate, with the first data layer having a partially reflecting mirror layer.

Note that CDs of all types have the data just below the label, with just the lacquer separating the two. Single layer DVDs have the data in the approximate middle of the layer stack, about 0.6 mm of the approx 1.2 mm thickness. Dual layer DVDs have some separation of the two data layers, but they are substantially in the center of the disk.

Semi-transparent metal reflecting layer and/or the data layer arrangements which are read using blue lasers as different from red and IR lasers, are fully within the purview of the invention. The digital data stored on different types of optical media (e.g. CDs, DVDs, Blu-ray discs, etc.) having different substrate thicknesses may be written or read using lasers of different wavelengths. For a CD, the substrate may be 1.2 mm thick and a 780 nm IR laser may be used. For a DVD, the substrate may be 400 μm to 800 μm thick and a 650 nm red laser may be used. For a Blu-ray disc, the substrate may be 100 μm thick and a 410 nm blueR laser may be used. Regardless of the type of laser or the substrate thickness, however, the same issue with using the same laser and optics to write both the data layer (where the substrate causes spherical aberration) and the labeling layer (where there is little or no substrate and thus little or no spherical aberration) arises.

Commercially manufactured media containing predefined data, such as a movie or computer software, typically include a silkscreen type label on top of the lacquer layer 140, and thus labeling using the laser is not performed. However, blank discs, may include a thin labeling film (approximately 4-9 microns thick) of monochromatic, laser-sensitive material is positioned on top of the lacquer layer 140. In one example, a thin label layer 150 of laser-sensitive material is provided which may be made from a variety of materials. Note that the material used for the label layer 150 is not limiting on the invention. These labels are configured to be written to using direct disc labeling arrangements such as developed by Hewlett Packard® for example. One such suitable material is described in U.S. patent application publication 20030108708 by Anderson et al., "Integrated CD/DVC recording and labeling", which is assigned to the assignee of the present invention.

Figure 2B:
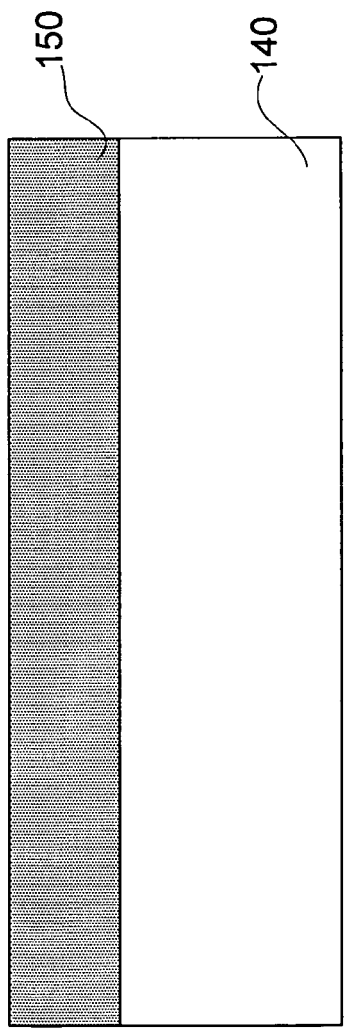
FIGS. 2B and 2C are enlarged sectional view of a portion of the disc depicted in FIG. 2A show embodiments wherein the label film or layer is applied directly to a thin layer of lacquer and wherein the label film is itself provided with a thin protective layer.
Figure 2C:
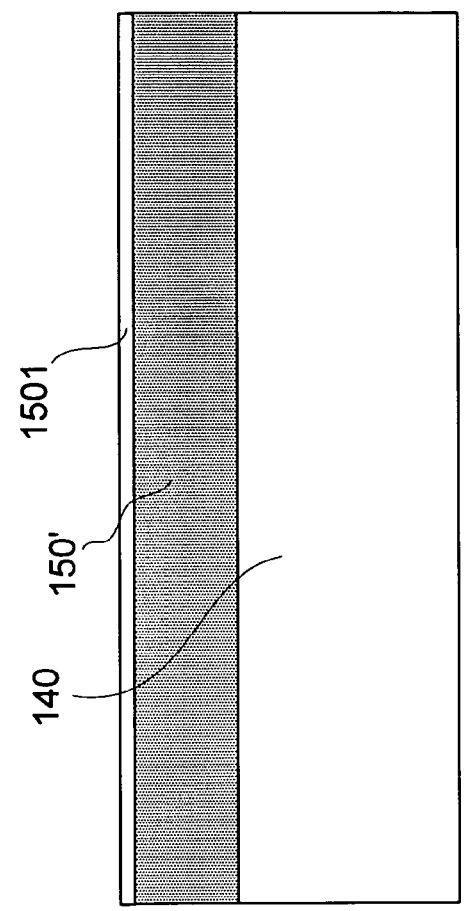

In one embodiment, this label layer 150 has no covering medium or substrate and is directly exposed to the laser during the label writing mode of operation (see FIG. 2B). However, this arrangement, while being durable, also exposes the label to the possibility of direct contact with the fingers of a person handling the disc. In a small percentage of the population, the skin is slightly acidic and it is therefore proposed, in one embodiment, to provide the label 150' with a thin transparent protective layer 1501 (see FIG. 2C). This thin transparent protective layer obviates the possibility of fingerprint-like marks and the like inadvertently developing on the label. This protective layer also tends to protect the label from other contaminants and thus preserves the aesthetic value of the label against accidental spillages and the like.

The protective layer is sufficiently thin that it has no effect on the spherical aberration correction which is necessary in embodiments wherein no protective layer is provided. The thickness is less than about 30 μm and in certain embodiments, can be less than 10 μm or even as little as about 1-5 μm. Thus, the aberration correction which implemented with discs wherein the label is not provided with a protective layer finds equal utility with labels where the above-mention thin protective layer is provided.

In some instances, the material forming the label layer 150 is of a neutral color prior to activation. The material is modified/activated by energy from a laser. The laser energy causes the activated film to change color and/or darkness, thereby producing an image. However, in some of the above-mentioned direct disc labeling arrangements, it is necessary to remove the disc from a data/read write orientation and reinsert the disc in an inverted or label writing position wherein the material can be directly exposed to the laser energy from the optical pickup unit or OPU used for data read/write operations, without passing through substrate 110. The optics associated with the OPU of the present invention are normally adapted to correct for the spherical aberration caused by the laser energy passing through the substrate 110. However, when the disc is flipped over for label writing, the laser energy is applied to layer 150 without passing through substrate 110, and so the correction which works well during the read/write mode now becomes a drawback. The embodiments of the invention which are discussed hereinafter are such as provide a solution to this problem.

Figure 3:
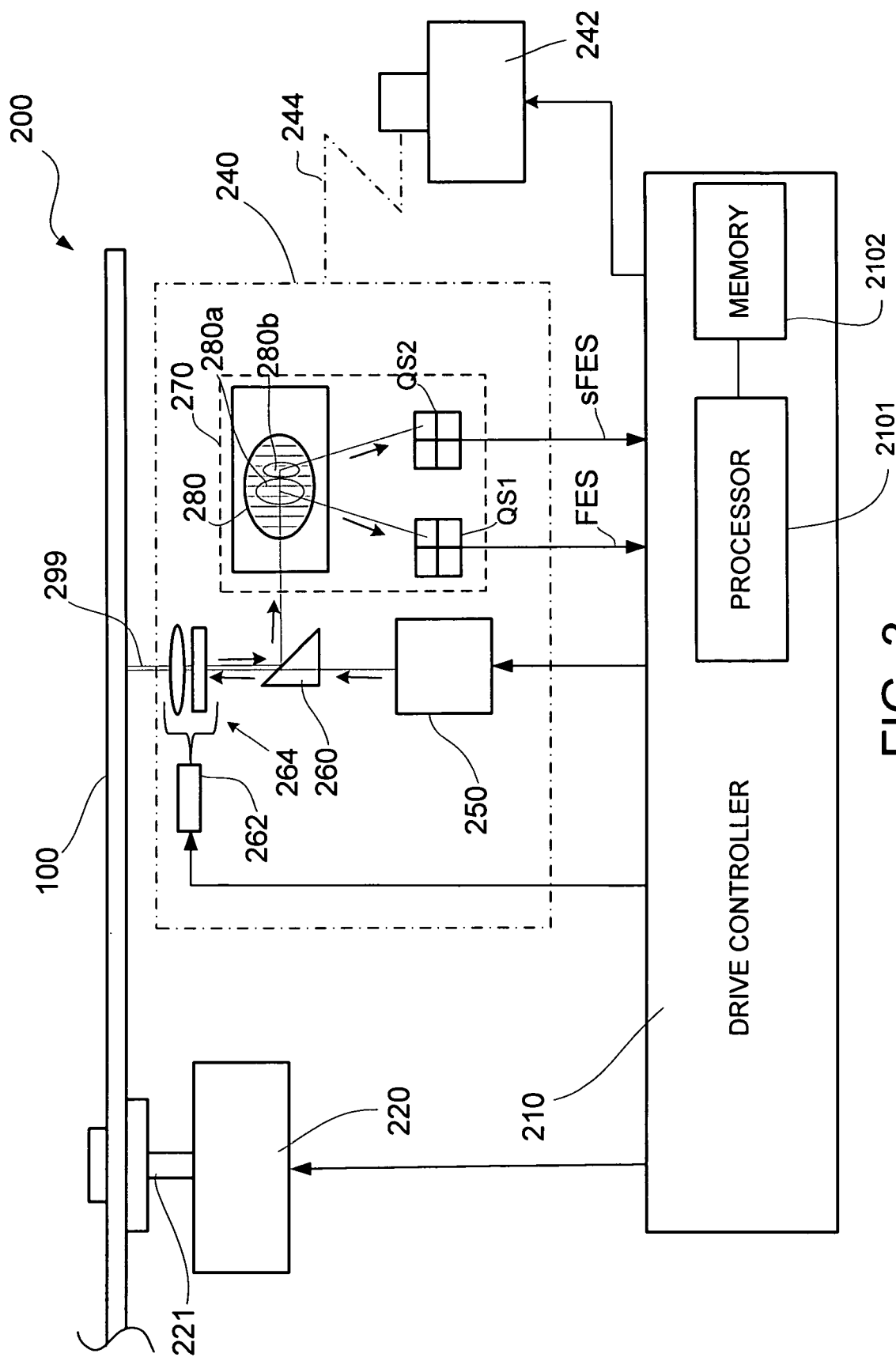
FIG. 3 is a schematic illustration of a digital media drive in accordance with an embodiment of the invention.

FIG. 3 schematically illustrates a digital media drive which is equipped with a embodiment of the invention. The drive 200 includes a drive controller 210 adapted to control a spindle motor 220. The drive controller, depending on the embodiment, may include a motor-drive sub-module. In the illustrated embodiment, the controller includes a processor 2101 and a memory 2102.

The spindle 221 causes a digital medium 100 mounted thereon to spin, exposing the various regions of the digital medium 100 to a laser beam designated by the numeral 299 in this embodiment.

The system 200 includes an optical module or arrangement 240 having a laser module or source 250, a prism 260 to deflect at least a portion of a return signal to a sensor arrangement 270. The laser module 250 may include a laser driver adapted to generate the appropriate laser energy. In one embodiment, the same laser module 250 may be adapted for writing and reading data from the digital medium, as well as marking the labeling layer. Further, the laser module 250 may be configured for a specific digital medium, such as a CD or a DVD.

The optical module or arrangement 240 is operatively connected with a sled motor 242 via a sled 244 (schematically represented in single dot phantom) so as to enable the necessary scanning of the digital medium 100 by laser beam 299. The optical module further includes a focus actuator 262 which adjusts the optics 264 which are used to focus the laser 299 on the rotating digital medium or disc, as it will be referred to hereinafter.

When laser energy is generated by the laser module 250, the laser beam 299 is directed through the prism 260 to the digital medium 100 via the optics 264. At least some of the laser energy is reflected by the digital medium 100, and the reflected energy is at least partially deflected by the prism 260 toward the sensor module 270. The deflected portion of the reflected energy is received by the sensor arrangement 270.

In this embodiment, the sensor arrangement 270 includes a HOE (Holographic Optical Element) 280 and two quad sensors QS1 and QS2. The HOE 270 (schematically illustrated) is depicted as having two portions 280a and 280b which are respectively arranged to reflect laser light to the two quad sensors QS1 and QS2. The first HOE portion 280a is arranged to produce a spherical aberration correction which compensates for the effect of the transparent polycarbonate or glass layer such as layer 110 which is shown in FIG. 2 and which can be 1.2 mm thick for example. The second HOE portion is arranged to not produce this effect and to be configured for correct generation of a focus error signal (sFES) in accordance with the direct contact of the laser beam 299 with the label layer 150.

The outputs of the two sensors QS1 and QS2 are respectively FES and sFES. During data read/write operations the FES output of QS1 is used for closed loop control of the optics 264 and the like. However, when the disc 100 is flipped over, the drive controller 210 switches from quad sensor QS1 to QS2 and thus becomes responsive to the sFES signal. This ensures that the correction which is applied during the data read/write mode of operation is not applied during the label writing mode and allows the focus of the laser to be accurate and enable optimal label writing to be carried out.

The drive knows when to switch from data mode to label mode, i.e. it knows which side is adjacent the laser by sensing the type of writing surface, i.e. data or label by using the label media identification area on the inner diameter of the label disk, or the data disk information areas on the inner diameter of a data disk. Scanning these areas and reading the numerical codes there shows the drive if it is facing data or if it is facing a label. The drive can then act appropriately.

More specifically, the data mode is confirmed by the detection of the bits on the data side corresponding to the range of possible media types that this drive can read and write, example, CDROM, CD-R, CD-RW, DVDROM, DVD-R, DVD-RW. If none of these types are detected, then the drive will look for the media ID marks around the hub of the disk that indicate that this is the label side of the optical disk. Then the media ID bits are read in and describe the type of label media present.

Figure 5:
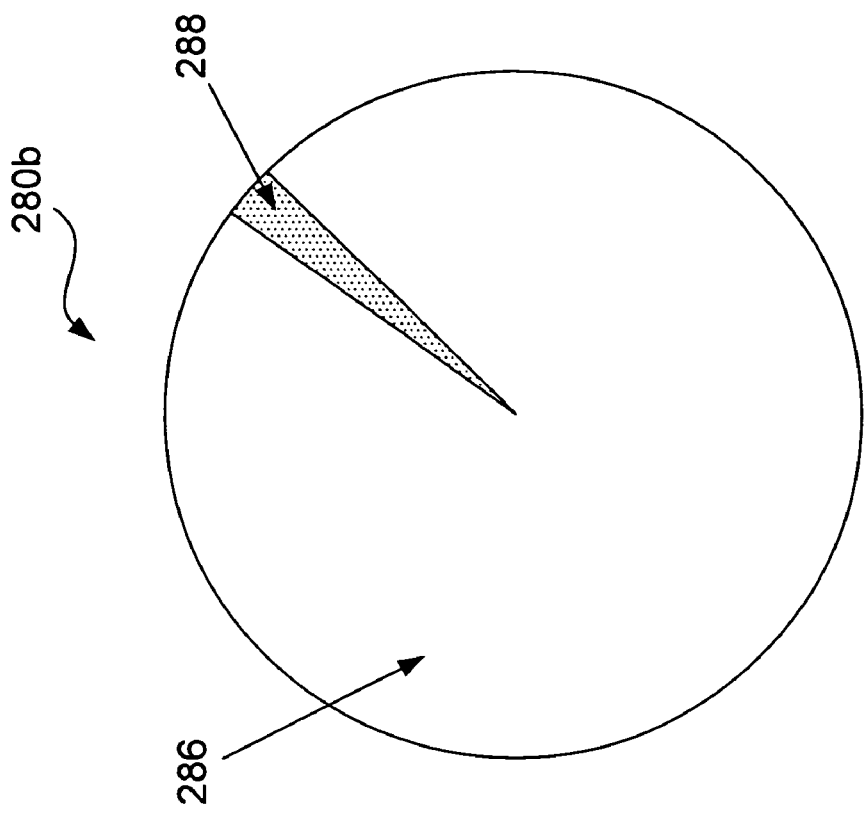
FIGS. 4 and 5 illustrate embodiments of holographic optical elements (HOE's) in accordance with embodiments of the present invention which can be used in the digital media drive arrangement depicted in FIG. 3.
Figure 4:
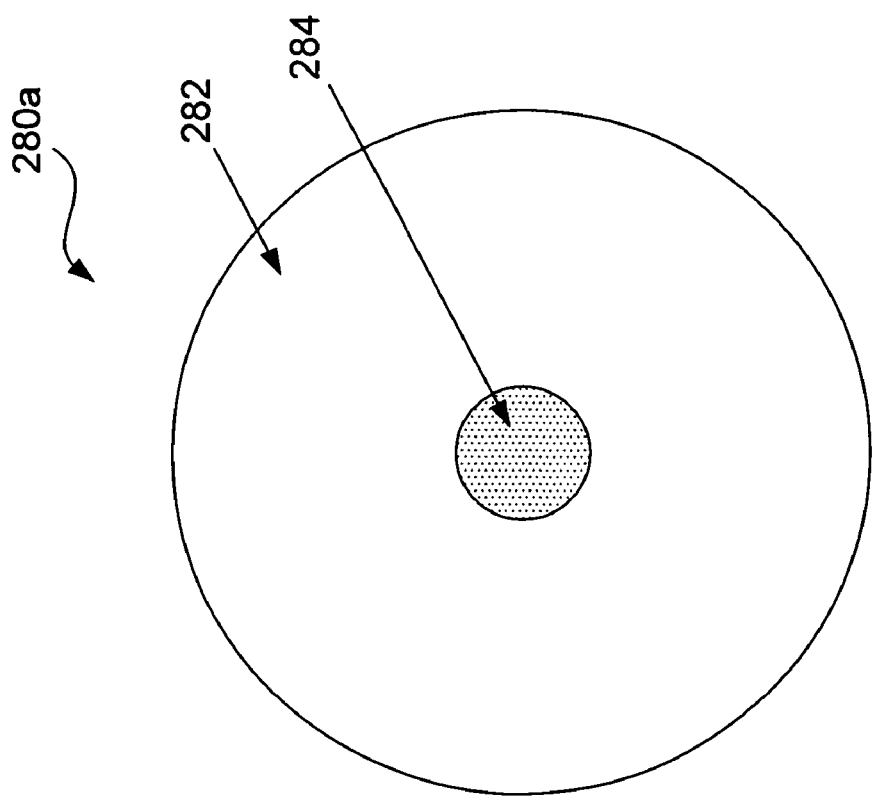

FIGS. 4 and 5 show examples of reflective HOE arrangements which can be used in the arrangement schematically depicted in FIG. 3. These HOE arrangements may be a thin film or a relief surface which has a refraction or reflection phase alteration pattern imprinted or embossed on it and are such that the reflected laser energy may be reflected or refracted and passed through the HOE.

More specifically the HOE achieves it's optical function by phase modification of the incoming optical wave front. One method of generating this is to imprint a contoured surface on a polymer. The master hologram can be computer generated and imaged onto resist or generated by illuminating resist directly using two phase-related optical beams, one configured as a reference, another configured as an example of the desired optical function required of the finished HOE. The finished HOE, when illuminated by the correct wavelength of light, will reproduce the optical function recorded onto it. One example of an optical function is a toric lens of two specific focal lengths in X and Y meridians. This function is suitable for creating an astigmatic focus for a quad sensor. Correction for aberrations, such as spherical aberration, can be included in the recorded optical function.

By way of example, this HOE element can consist of a diffraction pattern rendered as a surface relief, or a thin film containing an index modulation throughout the thickness of the film. In exemplary embodiments of the invention the HOE elements can be divided into two categories: reflection holograms, in which incident and diffracted light are on the same side of the HOE element, and transmission holograms, in which incident and diffracted light are on opposite sides. The type used in certain drive embodiments is an embossed pattern (surface relief). The depth variations in the surface alter the relative phase of portions of the incoming wavefront, much as a lens does. A typical HOE in this instance would appear in cross section like the pits and lands of an optical disk (binary phase hologram), except that the pit and land sizes and locations are computer generated, and variable in size. The HOE in given embodiments of the disclosed system has areas on it that are configured to act like a lens. In this case the lens can, by way of example, be a toric lens designed to focus the light returned from the objective lens in an astigmatic fashion to allow for creation of a focus error signal from a four quadrant detector. The area used for label marking has an added correction for spherical aberration, as well, so that the four quadrant detector will operate correctly when the objective is focusing through air.

In these arrangements, the smaller sections 284 and 288 are those which are adapted not to produce correction for spherical aberration or other effects which are encountered and need to be corrected for during data read/write modes of operation.

More specifically, the circular HOE 280a illustrated in the exemplary embodiment of FIG. 4 is separated into two regions 282, 284. The two regions 282, 284 are configured as concentric regions. A large outer circular region 282 is provided to process the energy reflected from the digital medium, by either reflecting or refracting the energy, to generate one signal, while a smaller inner circular region 284 is provided to process the energy reflected from the digital medium to generate a second signal.

In a particular embodiment, the larger of the two regions 282, 284 is used to generate an error signal corresponding to the data layer, while the smaller of the two regions 282, 284 is used to generate an error signal corresponding to the labeling layer. In one embodiment, the larger region 282 corresponds to approximately 95 percent of the total surface area of the HOE 280a, and the smaller region 284 corresponds to approximately five percent of the total surface area. Thus, the focusing accuracy of the digital media drive for reading from or writing to the data layer is not sacrificed, while a signal is provided to enable a feedback loop usable to maintain proper focus when writing to the labeling layer.

The above mentioned ratio (i.e. the 95% of the total surface area of the HOE) is a factor of the impact on signal to noise ratio on the data side and the need for a minimum signal to noise ratio for the label writing side. Reducing the irradiance by 5% on the data side gives a 0.2 dB reduction, which is insignificant for a system SNR (signal to noise ratio) of perhaps 18 dB. For the labeling writing system, reducing the signal by 95% (i.e. 5% light used) gives a reduction in SNR of 13 dB, leaving 5 dB SNR remaining. However, in some embodiments it has been found that the approximately 40 Hz bandwidth required for simple focus control will work adequately with an SNR of 5 dB and a high allowed error rate, while the data side requires a bandwidth of about 30 MHz and a low corrected error rate.

The purpose of such a ratio is to minimally impact the data side of the optical disk function. 95% of the optical disk light gives only a 0.2 dB reduction in SNR, and almost no change in SNR. 5% of the light gives us a 13 dB reduction in SNR for the label side. Experiments, wherein a reduction in the amount of light available for sensor functions on the label side, show that at 5%, there is enough light to achieve suitable operation.

The tradeoff between the proportion of signal used for data and for labeling can be adjusted for each drive design, to give reliable performance for both functions. It is also possible, in some embodiments, to increase the amount of light used for the focus control, providing that such light is not at a level to create a mark on the label side of the disk.

FIG. 5 illustrates another embodiment of a HOE 280b having a circular configuration. The circular HOE 280b is also separated into two regions 286, 288. The two regions 286, 288 are configured as sectors of the circular HOE 280b. A large sector region 286 is provided to process the energy reflected from the digital medium to generate an error signal corresponding to the data layer, while a smaller sector region 288 is provided to process the energy reflected from the digital medium to generate an error signal corresponding to the labeling layer.

In addition to concentric regions and sector regions, other configurations will be apparent to those skilled in the art and are contemplated within the scope of the invention. Further, although FIGS. 4 and 5 each illustrate a circular HOE, other shapes for HOE's are also contemplated. For example, a rectangular HOE may be divided into two or more regions for generating two or more error signals.

FIG. 6 schematically depicts a further embodiment of the invention. In this arrangement, the laser source or module 350 is arranged to direct a laser beam through a first section 370a of HOE 370 to a disc 100 via an optics arrangement 364 which is operatively connected with a focus actuator 362, and to direct the reflection into second and third sections 370b and 370c. The second section 370b of the optical element is provided with a lens arrangement 371 which is configured to correct for spherical aberration, while the second section 370c is provided with a lens arrangement 372 which is not so configured and is adapted in accordance with absence of any transparent layer between the laser beam and the label layer 150.

The lens arrangements 371 and 372 respectively focus the portion of the laser reflection which passes therethrough, on sensors which in this arrangement are first and second quad sensors QS1 and QS2. The lens 371 and 372 can be conventional lenses or HOE as desired. The drive controller selects which of the two signals (i.e. the signals produced by QS1 or QS2) is to be used based on the orientation of the disc in the drive. The controller will use the state of a stored variable to indicate that the optics are facing a label or a data area to choose which sensor to use.

It should be noted at this point that the sensors which are used in the above disclosed embodiments of the invention are not limited to the above mentioned quad sensor types and that any suitable sensor arrangement or arrangements having light sensitive elements can be used provided that the appropriate control signals can be derived and provided to the drive controller.

It should also be noted that while the correction for spherical aberration is disclosed as being carried out by the HOE, it is possible that the optics (e.g. 264, 364) which focus the laser on the disc and transmit the reflected beam back, can be configured to correct for the aberration which is caused by the relative thick transparent polycarbonate or glass layer 110, and that the lens (e.g. 371) or reflective arrangement which is used to direct light to the second sensor arrangement, e.g. QS2, can be arranged to produce a negative or counter correcting effect which removes the correction which has been already provided.

Figure 7:
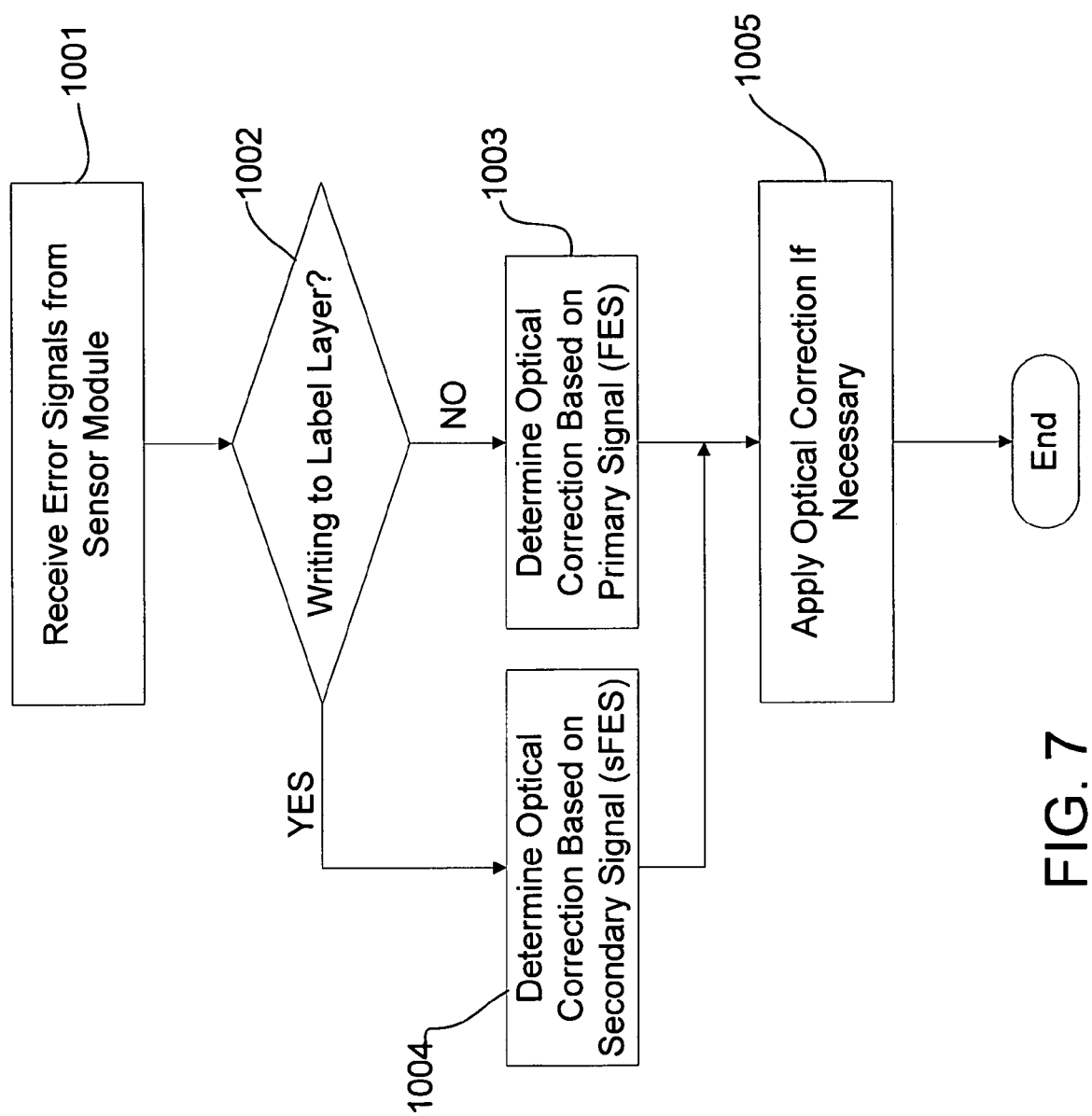
FIG. 7 is a flow chart illustrating the steps which are implemented in accordance with a control embodiment according to the present invention which is used in connection with the digital media drive depicted in FIG. 2.

FIG. 7 illustrates an exemplary method for focusing a digital media drive, such as the digital media drive 200 illustrated in FIG. 3. The method may be implemented in the drive controller 210, for example. The method includes receiving error signals from the sensor module/arrangement (step 1001). In this regard, the sensor arrangement provided with the HOE, may generate two or more error signals. For example, with reference to FIG. 4, the outer circular region 282 may result in a primary error signal corresponding to the data layer of the digital medium. Similarly, the smaller inner region 284 may result in a secondary error signal corresponding to the label layer of the digital medium.

At step 1002 a determination is made as to whether the current function of the digital media drive is writing to the labeling layer of the digital medium. The drive controller 210 may make this determination based on instructions received from a processor, such as the CPU of a computer, for example.

If the determination is made at step 1002 that the current function of the digital media drive is not writing to a labeling layer, it is concluded that that the current function is reading from or writing to the data layer and proceeds to block 1003. Accordingly, at step 1003, the primary error signal FES is used to determine an optical correction required to compensate for any aberration, vibration or the like, during the reading from or writing to the data layer.

On the other hand, if the determination is made at step 1002 that the current function of the digital media drive is indeed writing to a labeling layer, the method proceeds to block 1004. At step 1004, the secondary error signal sFES is used to determine a focal correction required to position the lens at the correct distance for writing to the media and to compensate for any vibrations, for example, during the writing to the labeling layer.

Note should be had to the fact that in one embodiment the sFES can be also be corrected to give the focus distance at an offset from best focus. This is done to prevent the focused spot of energy from being too intense and/or too small. A typical offset is −30 μm from best focus for a CD writer drive. It varies from +80 μm to −80 μm typically for usual data drives doing labeling. Other drives, optics and media types operate at other optimum offsets.

At step 1005, the focal correction determined at either step 1003 or block 1004, is applied. In this regard, the correction may be a translation of the laser module 250 shown in FIG. 3 by focus actuator 262 along the axis of the laser beam 299. Further, the focal position may be determined and applied repeatedly on a regular basis.

The foregoing description of embodiments of the invention have been presented for purposes of illustration and description. It is not intended to be exhaustive or to limit the invention to the precise form disclosed, and modifications and variation are possible in light of the above teachings or may be acquired from practice of the invention. The embodiment was chosen and described in order to explain the principles of the invention and its practical application to enable one skilled in the art to utilize the invention in various embodiments and with various modification as are suited to the particular use contemplated. It is intended that the scope of the invention be defined by the claims appended hereto and their equivalents.

For example, while two error signals FES and sFES are disclosed as being produced by the embodiments of the invention, it is possible that multiple signals may be produced during the data read/write mode and multiple signals may be produced during the label writing mode. This can be achieved, for example, by adding further beam splitting elements and multiplying the number of reflected beam/sensor arrangements that are used in conjunction therewith. Alternatively, the HOE elements can be configured to have more than two sections and be able to focus multiple reflections on multiple sensors. The variants which are possible will be self-evident to the person of skill in the art to which this invention pertains or most closely pertains, given the preceding disclosure.

By further way of example a further embodiment of the invention may reside in a method of focusing an objective lens of a multi-function digital media drive. This method can include generating a first signal indicative of a focus recording layer of a digital medium in the drive; and generating a second signal indicative of a focus error of the energy beam directly onto a second recording layer of the digital medium.

By way of example this first energy transmissive layer is thicker than 30 μm. On the other hand the second recording layer is thinner than 30 μm and is not covered with an energy transmissive layer. The determination of the focus correction is based on at least one of the signals.

In one embodiment the first and second signals are generated by optical sensors responsive to energy reflected from the medium. More specifically, the signals are produced by directing reflected energy via a holographic optical element (HOE) having two or more regions, each region having distinct optical characteristics and corresponding to one of the error signals, to the optical sensors.

Yet another embodiment of the invention resides in a method of recording on an optical medium. This method is such as to determine whether the recording includes writing computer-readable binary data marks to a data layer of the optical medium. If the recording includes writing the data marks, the method includes focusing energy onto the data layer in accordance with a first focus error signal. The method also includes the step of determining whether the recording includes writing optically visible labeling marks to a label layer of the optical medium. In this instance, if the recording includes writing the labeling marks, the method focuses energy onto the label layer in accordance with a second focus error signal.

A further embodiment of the invention resides in a program product for recording on an optical medium comprising: a computer readable medium (e.g. memory 2102) having machine readable program code embodied therein to be executed by a computer (e.g. processor 2101), the machine readable program code comprising code for: determining whether the recording includes writing computer-readable binary data marks to a data layer of the optical medium; if the recording includes writing the data marks, focusing energy onto the data layer in accordance with a first focus error signal determining whether the recording includes writing optically visible labeling marks to a label layer of the optical medium; and if the recording includes writing the labeling marks, focusing energy onto the label layer in accordance with a second focus error signal.

What is claimed is:

1. A method of facilitating focusing of a multi-function digital media drive, comprising:

generating two or more error signals each indicative of a focus of an energy beam by an optical arrangement onto different first and second recording layers of a digital medium in the drive, the first recording layer being covered with a protective, energy beam transparent substrate; and determining a focus correction based on a selected one of the error signals, wherein at least one of the two or more error signals corresponds to a data layer of the digital medium and at least another one of the two or more error signals corresponds to a labeling layer of the digital medium, and wherein the generating two or more error signals further comprises:

generating the energy beam;

projecting the energy beam against the medium;

reflecting the energy beam which is reflected off the medium to an optical element;

using the optical element, which has two or more regions that have optical characteristics selected in accordance with corrections to be implemented by the two or more error signals, to direct beam energy to two or more sensor arrangements respectively, and using the outputs of the two or more sensor arrangements to derive the two or more error signals.

* * * * *

UNITED STATES PATENT AND TRADEMARK OFFICE
CERTIFICATE OF CORRECTION

PATENT NO. : 7,679,633 B2  Page 1 of 1
APPLICATION NO. : 11/237979
DATED : March 16, 2010
INVENTOR(S) : Andrew L. Van Brocklin It is certified that error appears in the above-identified patent and that said Letters Patent is hereby corrected as shown below:

In column 8, line 47, after "focus" insert -- error of an energy beam through an energy transmissive layer onto a first --.

Signed and Sealed this

Seventh Day of September, 2010

David J. Kappos
*Director of the United States Patent and Trademark Office*